United States Patent
Saleh

(10) Patent No.: US 10,130,919 B1
(45) Date of Patent: *Nov. 20, 2018

(54) METHOD FOR MAKING A POLYGRAPHENE MEMBRANE FOR WATER DESALINATION

(71) Applicant: KING FAHD UNIVERSITY OF PETROLEUM AND MINERALS, Dhahran (SA)

(72) Inventor: Tawfik Abdo Saleh, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/052,129

(22) Filed: Aug. 1, 2018

Related U.S. Application Data

(63) Continuation of application No. 15/229,098, filed on Aug. 4, 2016, now Pat. No. 10,065,155.

(51) Int. Cl.
*C02F 1/44* (2006.01)
*B01D 67/00* (2006.01)
(Continued)

(52) U.S. Cl.
CPC ............ *B01D 71/56* (2013.01); *B01D 65/08* (2013.01); *B01D 67/0006* (2013.01); *B01D 67/0079* (2013.01); *B01D 67/0093* (2013.01); *B01D 69/125* (2013.01); *B01D 69/148* (2013.01); *B01D 71/021* (2013.01); *B29C 35/02* (2013.01); *B29D 7/01* (2013.01); *C01B 32/194* (2017.08); *C02F 1/44* (2013.01); *B01D 61/025* (2013.01); *B01D 71/68* (2013.01); *B01D 2323/30* (2013.01); *B29K 2077/00* (2013.01);
(Continued)

(58) Field of Classification Search
CPC ............ B01D 39/2055; B01D 67/0006; B01D 67/0039; B82Y 30/00; B82Y 40/00
See application file for complete search history.

(56) References Cited

U.S. PATENT DOCUMENTS

| 8,029,857 | B2 | 10/2011 | Hoek et al. | |
| 10,065,155 | B2 * | 9/2018 | Saleh | B01D 71/56 |

(Continued)

OTHER PUBLICATIONS

T. Remyamol, et al., Synthesis and nonlinear optical properties of reduced graphene oxide covalently functionalyzed with polyaniline, SciVerse ScienceDirect, Carbon 59 (2013) 308-314.

(Continued)

*Primary Examiner* — Ana M Fortuna
(74) *Attorney, Agent, or Firm* — Oblon, McClelland, Maier & Neustadt, L.L.P.

(57) ABSTRACT

A method for preparing a polygraphene membrane includes adding graphite and sodium nitrate into sulfuric acid to form a first mixture; adding potassium permanganate solution into the first mixture to form a second mixture; adding hydrogen peroxide solution to the second mixture to form a mixture including soluble manganese ions; filtering the mixture including soluble manganese ions to form an aqueous suspension; centrifuging the aqueous suspension; performing ultrasonication of the suspension to obtain graphene oxide sheets; acylating the graphene oxide sheets to prepare an acylated graphene oxide sheet; and polymerizing the acylated graphene oxide sheets to prepare polygraphene.

1 Claim, 2 Drawing Sheets

(51) Int. Cl.

| | | |
|---|---|---|
| *B01D 69/12* | (2006.01) | |
| *B01D 71/02* | (2006.01) | |
| *B01D 71/56* | (2006.01) | |
| *B01D 71/68* | (2006.01) | |
| *B29C 35/02* | (2006.01) | |
| *B29K 77/00* | (2006.01) | |
| *B01D 69/14* | (2006.01) | |
| *C02F 101/12* | (2006.01) | |
| *B29D 7/01* | (2006.01) | |
| *B01D 61/02* | (2006.01) | |
| *B01D 65/08* | (2006.01) | |
| *C01B 32/194* | (2017.01) | |
| *B29K 81/00* | (2006.01) | |
| *B29L 31/00* | (2006.01) | |
| *B29K 307/04* | (2006.01) | |
| *C02F 103/08* | (2006.01) | |

(52) U.S. Cl.
CPC ...... *B29K 2081/06* (2013.01); *B29K 2307/04* (2013.01); *B29L 2031/755* (2013.01); *C02F 2101/12* (2013.01); *C02F 2103/08* (2013.01)

(56) References Cited

U.S. PATENT DOCUMENTS

| | | | |
|---|---|---|---|
| 2012/0255899 | A1 | 10/2012 | Choi et al. |
| 2014/0151288 | A1 | 6/2014 | Miller et al. |
| 2015/0122727 | A1* | 5/2015 | Karnik ............... B01D 53/22 |
| | | | 210/500.21 |
| 2015/0132661 | A1 | 5/2015 | Chen et al. |
| 2016/0001236 | A1* | 1/2016 | Hoek ................ B01D 65/08 |
| | | | 210/654 |
| 2016/0334399 | A1 | 11/2016 | Hua et al. |
| 2017/0296976 | A1* | 10/2017 | Liu ................ B01D 65/108 |
| 2018/0036690 | A1* | 2/2018 | Saleh ................ B01D 71/56 |

OTHER PUBLICATIONS

Kian Ping Loh, et al., "The chemistry of graphene", DOI: 10.1039/B920539J (Feature Article) J. Mater. Chem., 2010, 20, 2277-2289.
Derwent Acc-No. 2017-86219 B (Abstract). corresponding to CN 107459772 A, Dec. 12, 2017.
Derwent Acc. No. 2015-049471, Derwent Week: 20139 (Abstract), CN 104138715 A, Nov. 12, 2014.
Derwent Acc. No. 2012-054167 (Abstract), Derwent Week: 201319; CN 102352038 A, Feb. 15, 2012.

* cited by examiner

METHOD FOR MAKING A POLYGRAPHENE MEMBRANE FOR WATER DESALINATION

CROSS-REFERENCE TO RELATED APPLICATIONS

The present application is a Continuation of Ser. No. 15/229,098, now allowed, having a filing date of Aug. 4, 2016.

BACKGROUND OF THE INVENTION

1. Field of the Invention

The present invention relates to membranes, and particularly to a method for preparing a polygraphene membrane.

2. Description of the Related Art

Many countries, especially those in the Arabian Gulf, are seeking solutions to convert salt water, e.g., seawater, into clean drinking water. Various approaches have been used to desalinate sea water such as distillation, reverse osmosis (RO) etc. For RO, typically a filter is used, which includes a porous or semipermeable membrane made from cellulose acetate or a polyimide thin-film composite.

A graphene membrane is a single-atomic-layer-thick layer of carbon atoms, bound together to define a sheet. The thickness of a single graphene membrane, which may be referred to as a layer or a sheet, is approximately 0.2 to 0.3 nanometers (nm) thick. The carbon atoms of the graphene layer define a repeating pattern of hexagonal ring structures (benzene rings) constructed of six carbon atoms, which form a honeycomb lattice of carbon atoms. An interstitial aperture is formed by each six carbon atom ring structure in the sheet and this interstitial aperture is less than one nanometer across.

Prior studies on graphene membranes have failed to provide a membrane suitable for use as a filtration membrane in salt water desalination using reverse osmosis. In these studies, it has been found, for example, that if the interlayer spacing of graphene is reduced, the nano-capillaries cannot be filled and water cannot permeate through completely.

Thus, a method of synthesizing polygraphene membranes solving the aforementioned problems is desired.

SUMMARY OF THE INVENTION

A method for preparing a polygraphene membrane includes adding graphite and sodium nitrate into sulfuric acid to form a first mixture; adding potassium permanganate solution into the first mixture to form a second mixture; adding hydrogen peroxide solution to the second mixture to form a mixture including soluble manganese ions; filtering the mixture including soluble manganese ions to form an aqueous suspension; centrifuging the aqueous suspension; performing ultrasonication of the suspension to obtain graphene oxide sheets; acylating the graphene oxide sheets to prepare an acylated graphene oxide sheet; and polymerizing the acylated graphene oxide sheets to prepare polygraphene.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
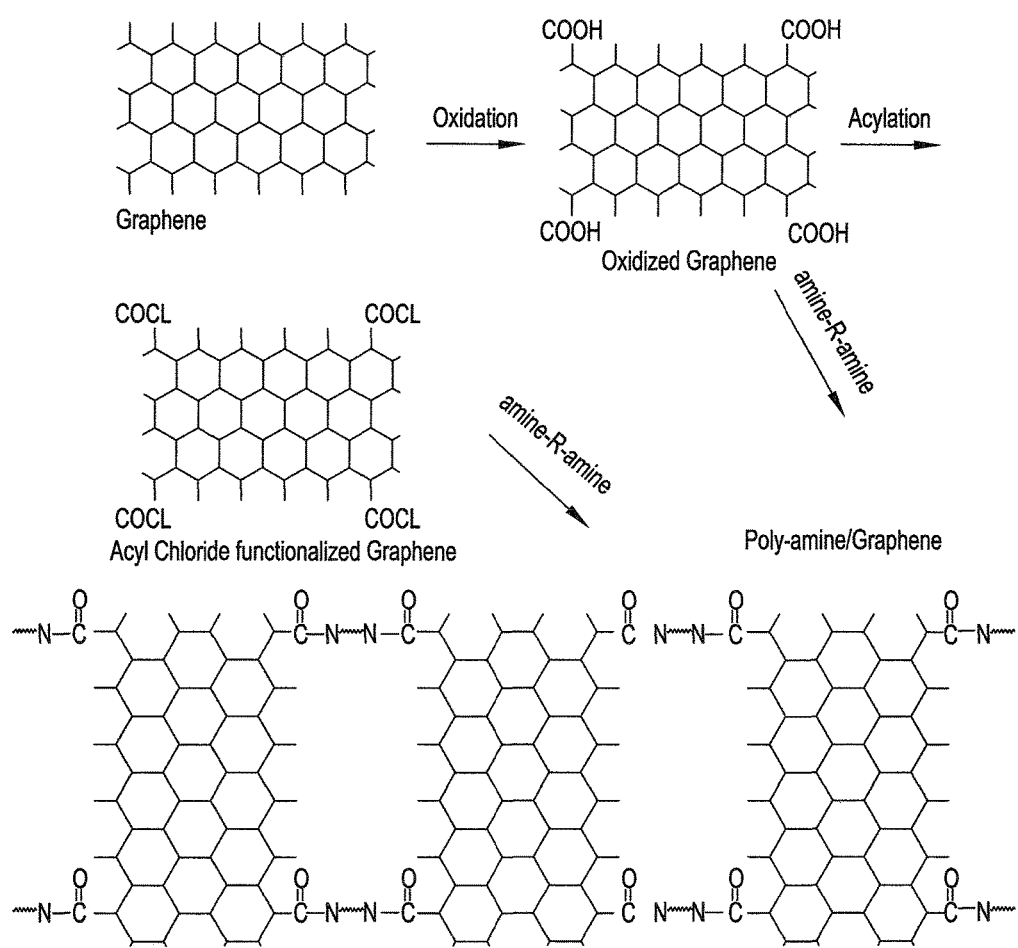
FIG. 1 is a schematic representation of the process of preparing polygraphene from graphite, according to the present teachings.

A method for preparing a polygraphene membrane includes adding graphite and sodium nitrate into sulfuric acid to form a first mixture; adding potassium permanganate solution into the first mixture to form a second mixture; adding hydrogen peroxide solution to the second mixture to form a mixture including soluble manganese ions; filtering the mixture including soluble manganese ions to form an aqueous suspension; centrifuging the aqueous suspension; performing ultrasonication of the suspension to obtain graphene oxide sheets; acylating the graphene oxide sheets to prepare an acylated graphene oxide sheet; and polymerizing the acylated graphene oxide sheets to prepare polygraphene. The graphene oxide sheets can be acylated by mixing the graphene oxide sheets with thionyl chloride ($SOCl_2$). The acylated graphene oxide sheets can be polymerized by mixing with amines, thiols, and/or amides. The amine can be diamine, diethylamine, dialkylamine, triamines, or bis(hexamethylene)triamine.

The polygraphene can be used to form a polygraphene filtration membrane. The polygraphene filtration membrane can include polygraphene alone or in combination with a second polymer. For example, the polygraphene can be subjected to interfacial polymerization with a second polymer to form the membrane. The polygraphene can be introduced, layer by layer, into the second polymer. The second polymer for preparing the membrane can be polyamide, polysulfone, or monomers thereof. Other suitable polymers or monomers thereof can be used. The polygraphene membrane can have numerous applications such as desalination of salt water for water purification.

Silver and/or titania can be introduced during the polymerization of the polygraphene sheets (in situ process) or during insertion of polygraphene within the second polymer. In this way, for example, silver-modified polygraphene, titanium-modified polygraphene, and/or silver/titanium-modified polygraphene can be prepared. The polygraphene filtration membrane can include one or more layers including polygraphene or modified polygraphene. The polygraphene filtration membrane can include one or more layers including polygraphene with polyamide or polysulfone. The polygraphene filtration membrane can include one or more layers including modified polygraphene with polyamide or polysulfone.

As discussed above, polymerization of graphene can include use of linkers to link the graphene or graphene oxide nanosheets. The linkers can be amines, thiols, amides, and/or derivatives thereof. The size of pores, interlayer spacing, reduction routes and paths of the graphene can be adjusted and controlled by the linker to make the membrane suitable for a specific application. For example, the membrane can be configured to separate salts, ions, metals, and/or organic pollutants, from water. Alternatively, the membrane can be configured for the separation of oil components, hydrogen, nitrogen, and/or or methane from gaseous media or gas.

The present polygraphene filtration membrane showed improved performance in terms of permeate flux and salt rejection relative to other filtration membranes. It is believed that this improvement can be attributed to the narrow dimension of the nanocapillaries and the co-existence of $sp^2$ aromatic channels with various oxygen functionalities. The polygraphene membranes can afford excellent permeability and selectivity toward various ions based on the molecular sieving effect and diverse chemical interactions, which are favorable for filtration and separation.

FIG. 1 shows an exemplary method of preparing polygraphene. Initially, graphite is oxidized using an oxidant such as $KMnO_4$ to prepare carboxylic acid functionalized graphene. Subsequently, the functionalized graphene is mixed with thionyl chloride ($SOCl_2$) to undergo acylation reaction. The acylated graphene product is reacted with diamine to form polyamine/graphene or "polygraphene". Thus, the process of polymerization of graphene includes the use of linkers to link the graphene (or graphene oxide) nanosheets. The linkers can be any amines, thiols and/or amides. The linkers can include, for example, thionyl chloride-$SOCl_2$-acylation reaction, diamine, diethylamine, dialkylamine or triamines, bis(hexamethylene)triamine, methanethiol, ethanethiol, 1-propanethiol, 2-propanethiol, butanethiol, tert-butyl mercaptan, pentanethiols, thiophenol, dimercaptosuccinic acid, or thioacetic acid.

Figure 2:
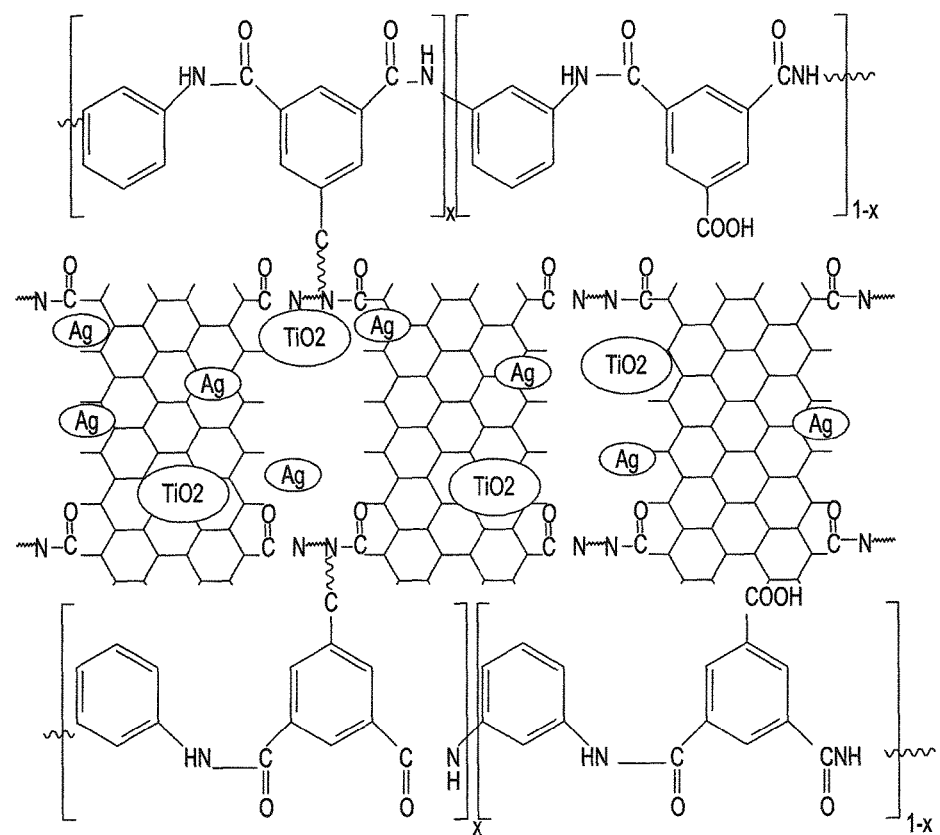
FIG. 2 is a schematic representation of a polygraphene membrane incorporating silver and titanium dioxide, according to the present teachings.

FIG. 2 shows the schematic representation of an exemplary polygraphene membrane including a polyamide backbone with silver and titanium dioxide dispersed therein. As discussed above, silver (Ag) and titania ($TiO_2$) can be added during the polymerization of poly-graphene sheets, i.e., during the in-situ polymerization process, or during the insertion of poly-graphene within the second polymer after the formation of the polygraphene.

The following example will further illustrate the method for the preparation of poly-graphene based membranes and should not be construed as specifically limiting the invention described and claimed herein.

EXAMPLE

Preparation of Polygraphene Membrane

Graphene was prepared from graphite by using a modified Hummers' method. Graphite and sodium nitrate were added to sulfuric acid while stirring to form a mixture. Potassium permanganate ($KMnO_4$) was slowly introduced into this mixture. Then, the mixture was stirred continuously at room temperature. Next, deionized water containing 30% hydrogen peroxide ($H_2O_2$) was introduced in order to reduce residual permanganate to soluble manganese ions. This was followed by filtration process to remove the residuals. Then, the aqueous suspension was centrifuged. Graphene oxide sheets were obtained by bath-sonication of the filtered graphite oxide suspension. The prepared carboxylic functionalized graphene was then mixed with thionyl chloride-$SOCl_2$-acylation reaction. The product was then mixed with diamine, diethylamine, dialkylamine triamines, or bis(hexamethylene)triamine to form polygraphene.

After the polymerization step of the graphene to make the polygraphene, the polygraphene was treated with silver, titania, or both. Polygraphene or polygraphene modified with silver and/or titania was inserted into a second polymer, layer by layer, via a modified polymerization process of the monomers such as via an interfacial polymerization process. The second polymer included polyamide or its monomers or polysulfone or its monomers. Interfacial polymerization reaction occurred from the aqueous phase of m-phenyl diamine and the organic phase of trimesoyl chloride in which poly-graphene, silver polygraphene, titania polygraphene, titania/silver polygraphene, or modified polygraphene were homogeneously dispersed.

It is to be understood that the present invention is not limited to the embodiments described above, but encompasses any and all embodiments within the scope of the following claims.

We claim:

1. A method for desalinating salt water for water purification, comprising:
the step of filtering the salt water through a polygraphene membrane, wherein the polygraphene membrane is porous and is prepared by a process comprising the steps of:
mixing graphite and sodium nitrate into sulfuric acid to form a first mixture;
adding potassium permanganate solution into the first mixture to form a second mixture;
adding hydrogen peroxide solution to the second mixture to form a mixture including soluble manganese ions;
filtering the mixture including soluble manganese ions to form an aqueous suspension;
centrifuging the aqueous suspension;
performing ultrasonication of the suspension to obtain graphene oxide sheets;
acylating the graphene oxide sheets to prepare an acylated graphene oxide sheet;
polymerizing the acylated graphene oxide sheet to prepare a polygraphene material, wherein the acylated graphene oxide sheet is polymerized by mixing with at least one of an amine, an amine derivative, a thiol, a thiol derivative, an amide, and an amide derivative; and
polymerizing the polygraphene material with at least one of polyamide and polysulfone to form the polygraphene membrane;
wherein at least one of, silver and titania is present during the polymerizing of the acylated graphene oxide sheet.

* * * * *